United States Patent [19]
Scalera
[11] Patent Number: 4,641,218
[45] Date of Patent: Feb. 3, 1987

[54] PROTECTOR WITH CIRCUIT DISABLER

[75] Inventor: Michael Scalera, Randolph
[73] Assignee: AT&T Bell Laboratories, Murray Hill, N.J.

[21] Appl. No.: 747,394
[22] Filed: Jun. 21, 1985

Related U.S. Application Data

[63] Continuation-in-part of Ser. No. 712,246, Mar. 15, 1985, abandoned.

[51] Int. Cl.⁴ ............ H02H 3/22
[52] U.S. Cl. ............ 361/119; 361/124; 337/32; 337/34
[58] Field of Search ............ 174/52 R; 361/117-119, 361/124, 129, 331, 380, 424, 427, 429; 337/28, 31-34; 339/198 R, 198 P

[56] References Cited

U.S. PATENT DOCUMENTS

| | | | |
|---|---|---|---|
| 1,551,700 | 9/1925 | Sands | 337/31 X |
| 1,736,028 | 12/1929 | Winklehaus | 339/198 R |
| 3,535,779 | 10/1970 | Wanaselja | 337/32 X |
| 3,587,021 | 6/1971 | Baumbach | 337/32 |
| 3,947,730 | 3/1976 | DeLuca et al. | 361/119 X |
| 4,071,876 | 1/1978 | Benson et al. | 361/331 X |
| 4,288,832 | 9/1981 | Saligny | 337/32 X |
| 4,325,100 | 4/1982 | Baumbach | 337/32 X |
| 4,420,792 | 12/1983 | Hegner et al. | 361/331 |
| 4,502,087 | 2/1985 | Huret | 361/119 |
| 4,504,883 | 3/1985 | Uchida et al. | 361/331 X |

*Primary Examiner*—A. D. Pellinen
*Assistant Examiner*—A. Jonathan Wysocki
*Attorney, Agent, or Firm*—Patrick E. Roberts

[57] ABSTRACT

In response to spurious signals in a circuit connecting telecommunications equipment with a serving central office, the signals will pass through terminals of a protector module and through a protector unit inserted in the circuit causing a lead pellet to melt or the air gap between carbon blocks to short and establish a path to ground so that the spurious signals may be grounded. When the protector unit is removed from the protector module, the circuit remains grounded until the protector unit is replaced. Alternatively, when the protector unit is removed, the electrical path of the circuit is opened by introducing an insulator in the path of signals between the terminals. In one embodiment, in the open circuit condition, unusually high voltages arc over from the protector terminals to a metallic pin and then to ground.

16 Claims, 12 Drawing Figures

PROTECTOR WITH CIRCUIT DISABLER

This application is a continuation-in-part, of application Ser. No. 712,246, filed Mar. 15, 1985 now abandoned.

TECHNICAL FIELD

This invention relates to telecommunications line protectors and, in particular, to protectors which have the ability to break electrical continuity in the line by either grounding the circuit or by providing a discontinuity in the circuit between a customer's equipment and the central office when a protector unit is removed for replacement.

BACKGROUND OF THE INVENTION

A protector unit, usually comprising carbon blocks, is introduced in parallel to the path of a circuit connecting a customer's equipment with the serving central office in order to protect the customer's equipment from excessive line voltages or excessive line currents. When the protector unit operates, a low impedance path to ground is presented, thus disabling the line. A problem with the prior art protectors, however, is that when the protector unit is removed for servicing, line continuity still exists between the central office and the customer's equipment. The customer's equipment is thus susceptible to damage until another functional protector unit is installed. It is important to protect the customer's equipment from damage at all times, even when the protector unit is removed for replacement.

An apparatus for protecting the customer's equipment from such damage by grounding the circuit is disclosed in U.S. Pat. No. 4,351,015 granted to Mr. Thomas J. Smith on Sept. 21, 1982. It is believed, however, that the aforesaid Smith apparatus will not be effective for multipair protectors because the means for grounding is located in the base of the device. This takes up a lot of space which is a problem for customers who have many lines to be protected and where space is a consideration.

SUMMARY OF THE INVENTION

In accordance with the illustrative embodiment of the present invention, there is shown a grounding chassis comprising a plurality of receptacles, each for housing a protector module. In one embodiment of this invention, when the protector unit is removed from the protector module, the circuit is opened. In another embodiment of this invention, when the protector unit is removed from the protector module, the circuit is grounded. In each case, the circuit remains so opened or grounded until the protector unit is replaced in the protector module, thereby protecting the customer's equipment at all times.

More particularly, a chassis which has a plurality of receptacles, each of which is used for receiving one of a plurality of protector modules, is connected to a source of ground.

In accordance with another embodiment of the present invention, when the line is in the open condition, spurious voltages are allowed to arc over from either an input terminal or output terminal to a centrally located conductive means and then to ground.

DETAILED DESCRIPTION

Figure 1:
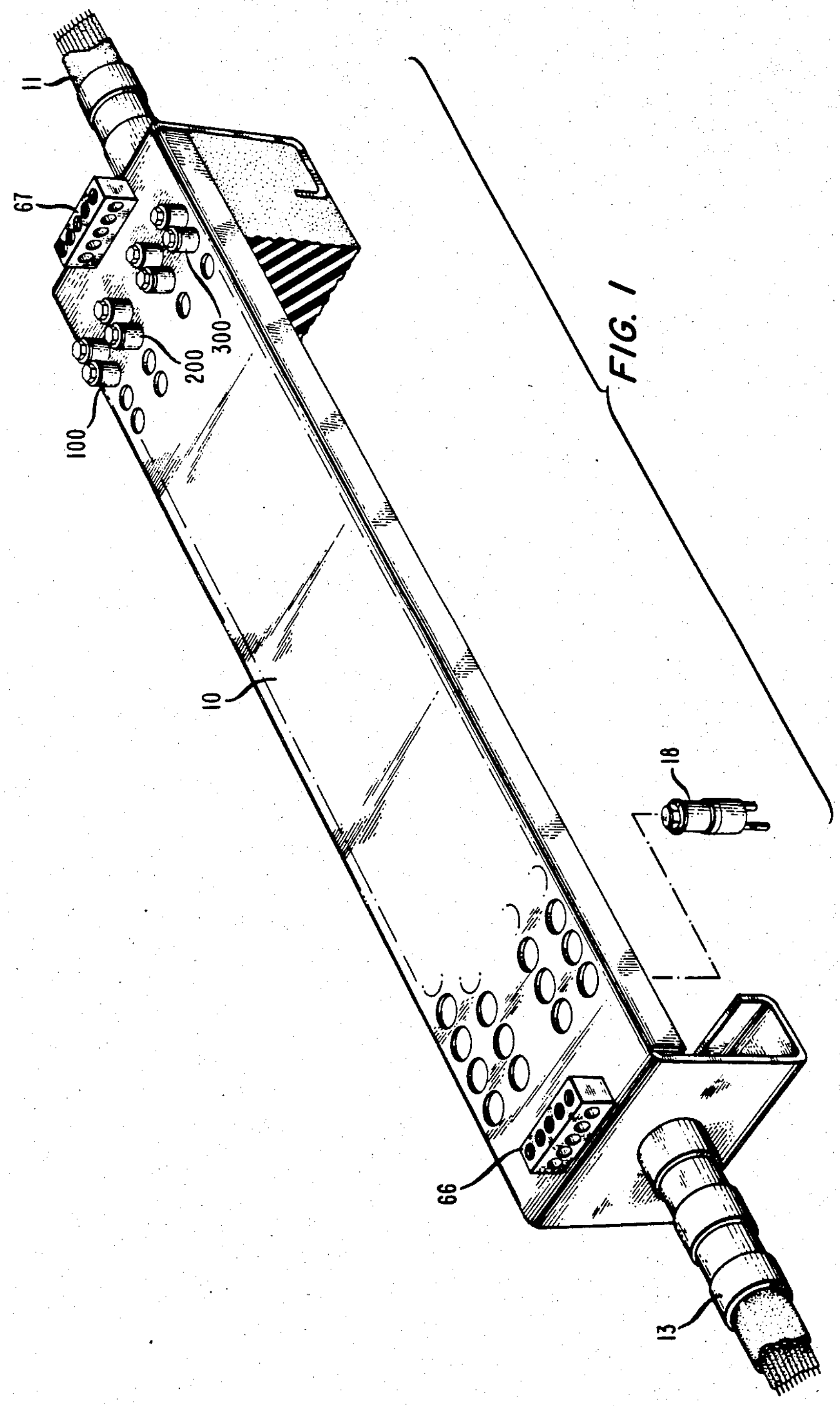
FIG. 1 shows a mounting chassis.

Referring to FIG. 1, there is shown a mounting chassis 10 which forms the ground plane for a plurality of receptacles for housing protector modules. Chassis 10 is used for housing a plurality of modules 100, 200 . . . 300. Each protector module such as 18 is introduced into a receptacle such as 17. Each conductor in a circuit from a customer to a central office is protected by a separate protector module. Wires from cable 11 are fastened to the input side of the protector modules. Opposite ends of these wires in cable 11 are terminated at the central office (not shown). Wires from cable 13 are fastened to the corresponding output side of the protector modules. The opposite ends of these wires in cable 13 are terminated at the customers' equipment (not shown).

Figure 2:
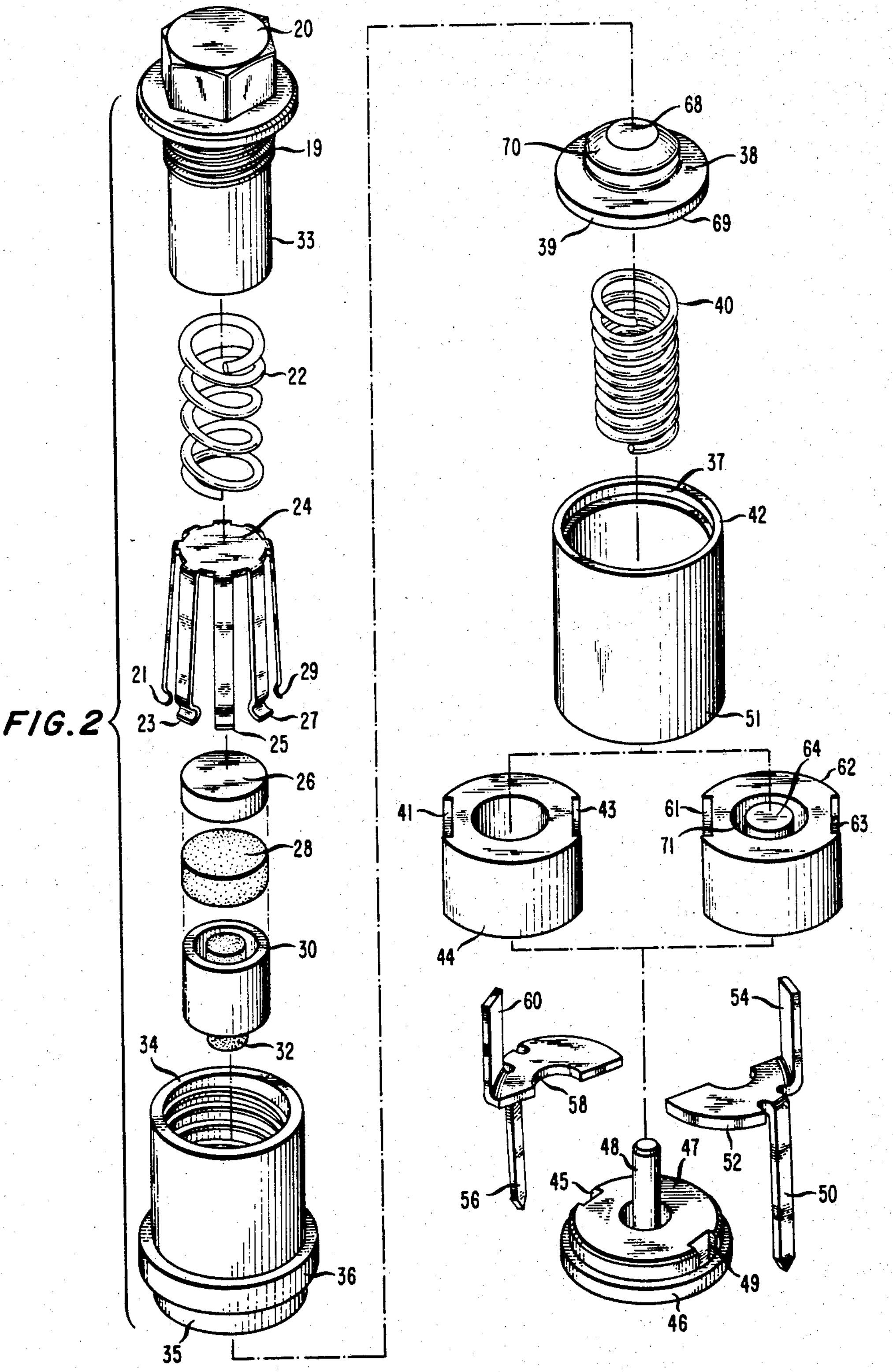
FIG. 2 is an exploded view of the essential components of an embodiment of the present invention.
Figure 3:
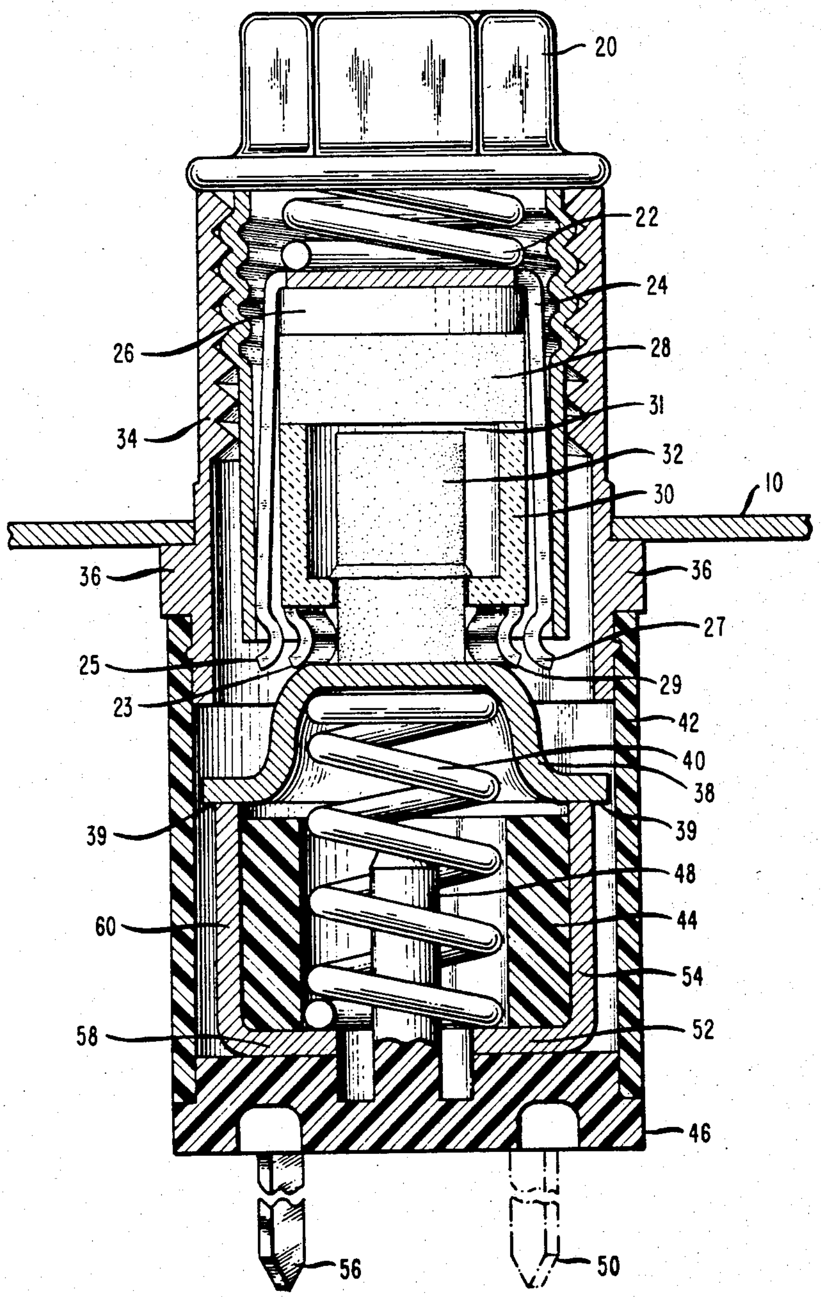
FIGS. 3, 4, 5 and 6 show an embodiment of the present invention and its operation under one set of conditions.

Referring to FIGS. 2 and 3, there is shown respectively, an exploded view of one of the aforesaid protector modules embodying the present invention and a partial sectional view of the assembled protector under normal operating conditions. Terminal 56 fits through recess 45 of base 46 so that surface 58 rests on surface 47; likewise, terminal 50 fits through recess 49 so that surface 52 rests on surface 47. Recesses 43 and 41 of spacer 44 engage arm 54 of terminal 50 and arm 60 of terminal 56, respectively, to lock and maintain these metallic terminals oriented in the vertical position. Terminals 50 and 56 are connected, respectively, to the customer's equipment (not shown) and to the telephone central office (not shown).

The aforesaid partially assembled base 46 is pressed-fit into end 51 of cylinder 42. Metallic spring 40 is then dropped into the cylindrical recess of spacer 44 around post 48. The bottom surface 39 of metallic bridge plate 38 is then placed over spring 40. Upper end 37 of cylinder 42 is pressed-fit over end 35 of cylinder 34, a grounding barrel, which in turn is pressed-fit into a cylindrical recess of metallic plate 10 so that rim 36 makes contact with the lower surface of metallic plate 10. Plate 10 makes contact with a metallic water pipe or similar ground by way of either one of the ground connectors 66 or 67 (FIG. 1) and a suitable conductor (not shown).

Ceramic cylinder 30 housing carbon block 32, followed by carbon block 28 and solder pellet 26 are mounted within inverted spring cage 24. This subassembly in turn is mounted within cylindrical cap 33 after inserting spring 22. The assembled unit comprises the protector unit. In this assembled condition, a finite gap 31, usually three mils, exists between carbon block 32 and carbon block 28. This protector unit is then inserted by threading into barrel 34. This action causes carbon 32 to contact surface 68 of bridging disk 38, and due to action of spring 22, pressure is applied. This pressure causes disk 38 to move downward against spring 40 until surface 39 makes contact with arm 54 of terminal 50 and arm 60 of terminal 56. Under this condition a functional path is established from terminal 50 by way of arm 54 to contact surface 39 of bridging disk 38 to arm 60 of terminal 56.

If a spurious high voltage appears in the circuit, the voltage will follow the path of low impedance established by the protector unit bypassing a customer's equipment thereby avoiding damage thereto. The voltage will follow the path established by either terminal 50 and arm 54 or terminal 56 and arm 60, surface 39 of bridging disk 38, contact surface 68 to carbon block 32 across air gap 31 to carbon block 28, to solder pellet 26, to metal cage 24, to spring 22, to metal housing 33, to cylinder 34, to chassis 10, to ground connectors 66 or 67 and then through an appropriate conductor (not shown) to an earth ground, by either a water pipe or a building ground.

Figure 4:
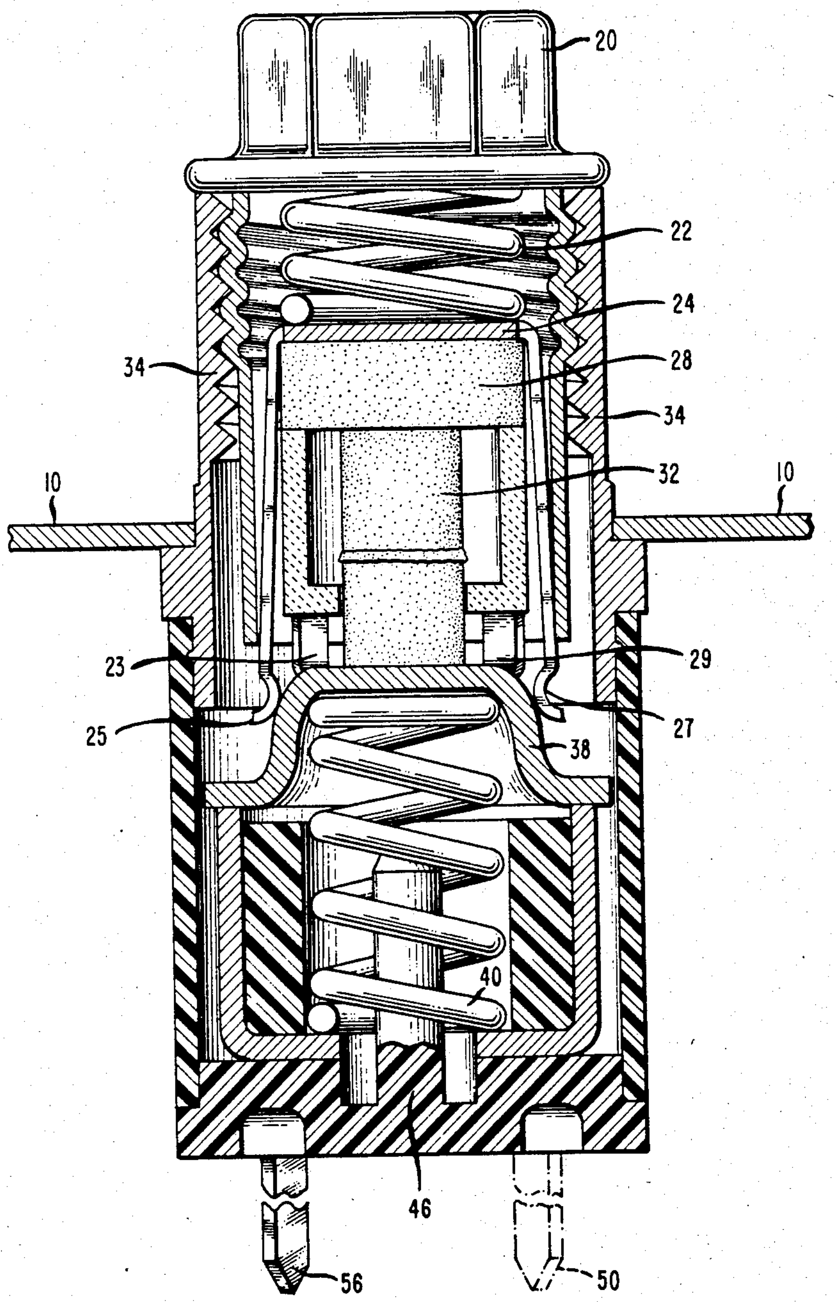

If a spurious high current is impinged on the circuit, a similar path is followed. The heat generated by the high current, however, causes solder pellet 26 to melt as shown in FIG. 4. This in turn causes cage 24 to move downwards because of the pressure from spring 22. When cage 24 moves downwards, its fingers 21, 23 . . . 29 are forced to make contact with surface 70 of bridging disk 38, thus establishing a path to ground by way of either terminal 50 and arm 54 or terminal 56 and arm 60, surface 39 of bridging disk 38, contact fingers 21 through 29 of cage 24, spring 22, to metal housing 33 to metal cylinder 34, to chassis 10 to ground connector 66 or 67 and then through an appropriate conductor (not shown) to a ground potential, by either a water pipe or a building ground (FIG. 4).

The aforesaid two operations are normal for the protector unit which may have one or more gas tubes (not shown) instead of the carbon blocks for longer life. The functions of the carbon blocks and those of the gas tube are the same.

Figure 5:
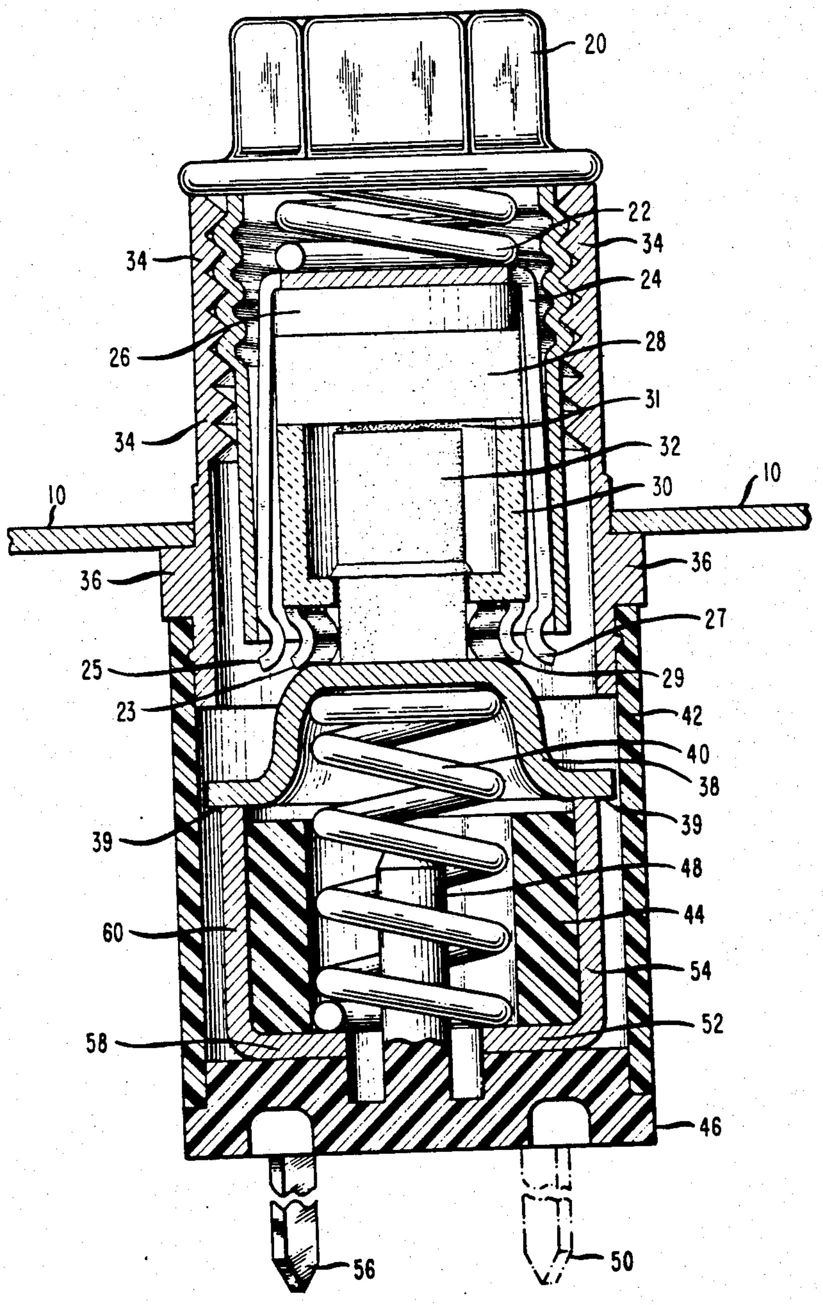

Sometimes the signals produced by the spurious voltages or currents are not sufficiently high to cause the protector to operate and ground the circuit permanently. But the carbon can be worn out sufficiently that the air gap between carbon block 32 and carbon block 28 will be so reduced that they touch and a permanent path will be established to ground through them, even though fingers 21, 23 . . . 29 do not touch bridge plate 38. This is shown in FIG. 5. In this case, the carbon blocks should be replaced.

Figure 6:
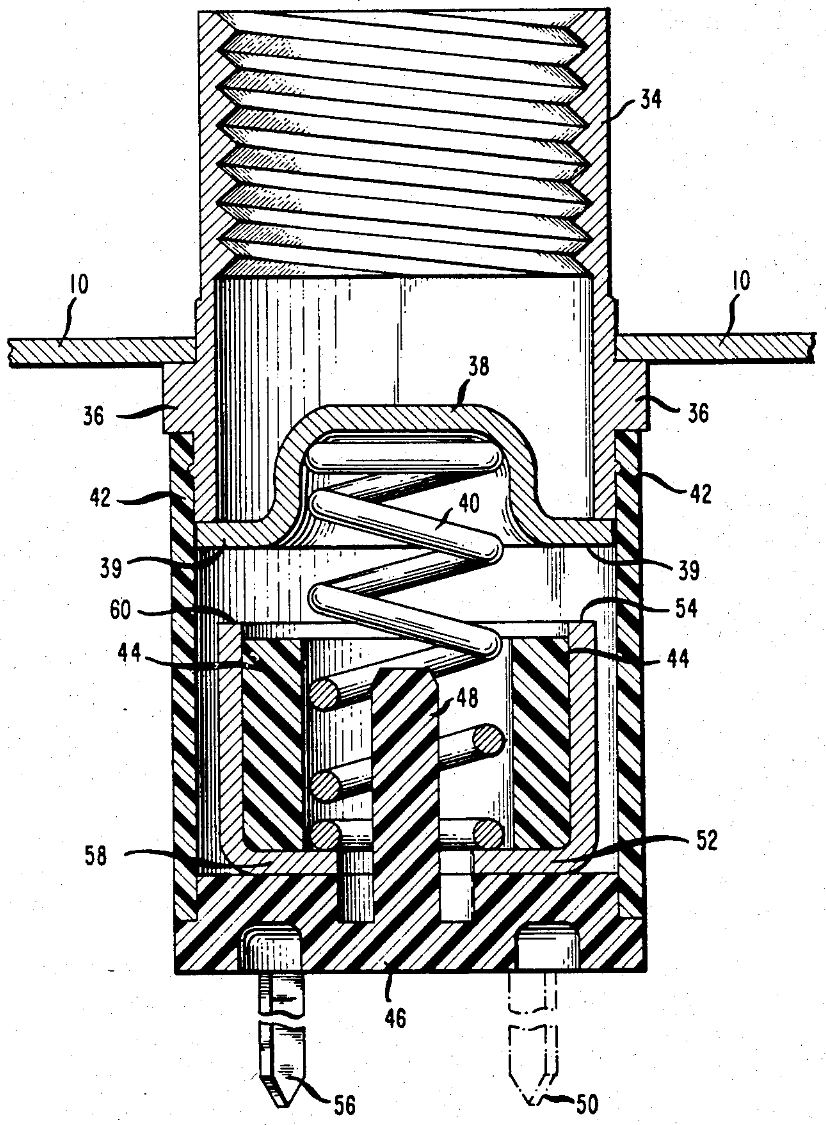

When the protector unit is removed for replacement, regardless of the cause of grounding, the circuit will remain grounded and hence disabled. This is shown in FIG. 6. When the protector unit is removed, spring 40 forces bridge disk 38 upwards to make direct contact with grounding barrel 34 which in turn is in contact with earth ground through ground plate 10. As before, the signal will flow from either terminal 50 or 56 through spring 40 which is in contact with terminal 50 and 56 and through bridge disk 38 to ground as stated hereinabove.

Figure 7:
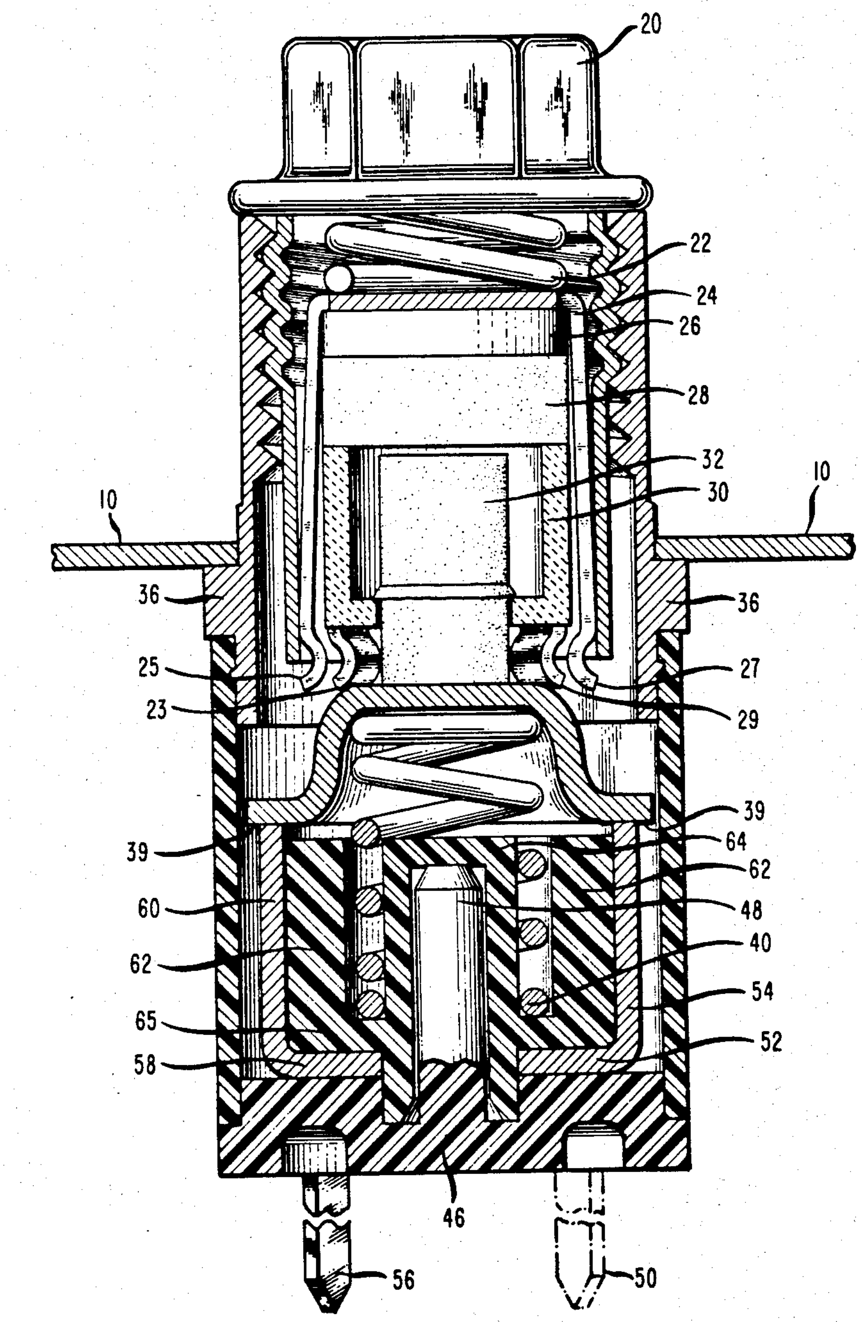
FIGS. 7, 8, 9 and 10 show another embodiment of the present invention and its operation under a different set of conditions.

Referring to FIGS. 2 and 7 there is shown another embodiment of the present invention. Instead of spacer 44 an insulator 62 is used. Unlike spacer 44, however, insulator 62 has an inner cylinder 71 which is covered at top 64 and mates with pin 48 of base 46. Inner cylinder 71 (FIG. 2) of insulator 62 has a base 65. Spring 40 fits into the inner cylinder 71. Inner cylinder 71 insulates spring 40 from surface 58 of terminal 56 and surface 52 of terminal 50. The protector module is assembled in exactly the same manner as described hereinabove for the prior embodiment.

Figure 8:
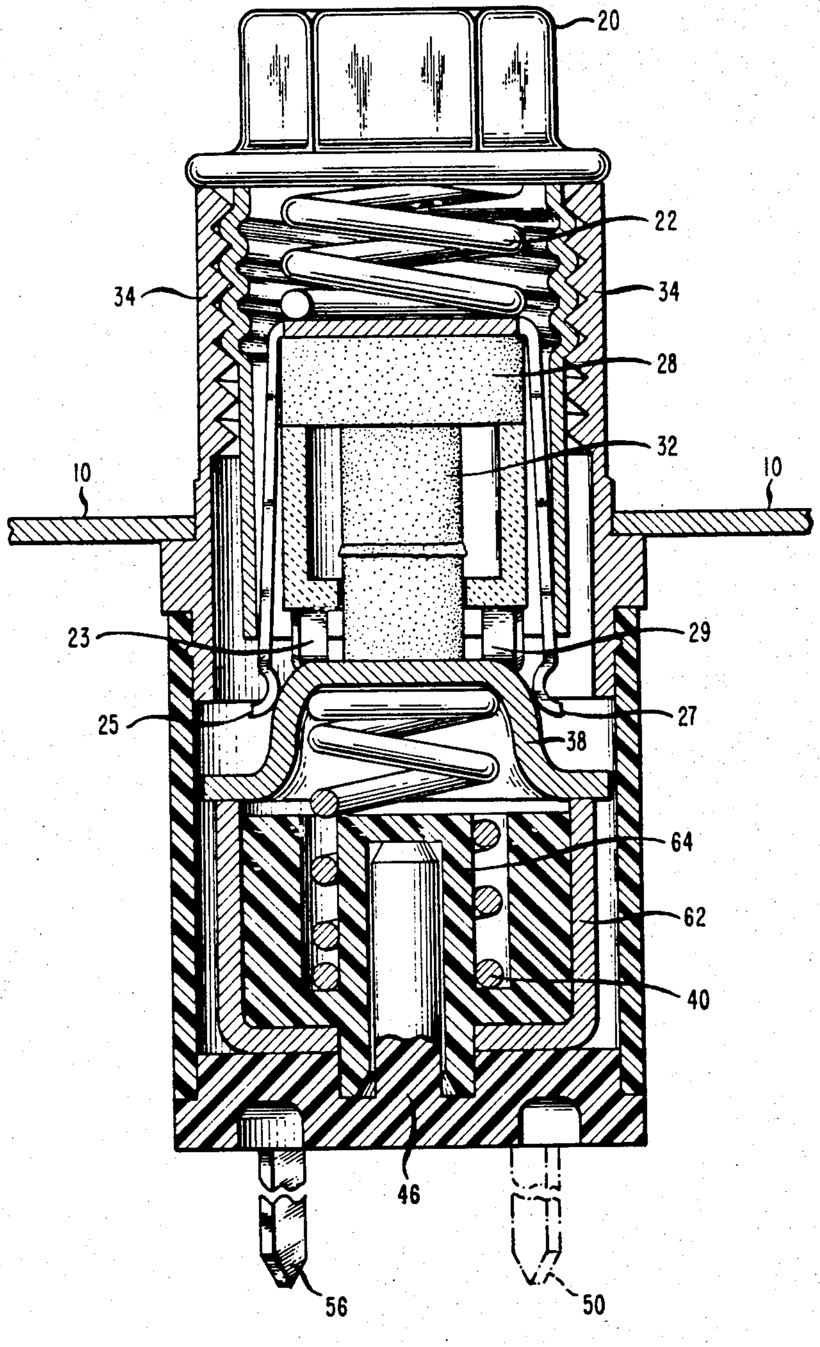
Figure 9:
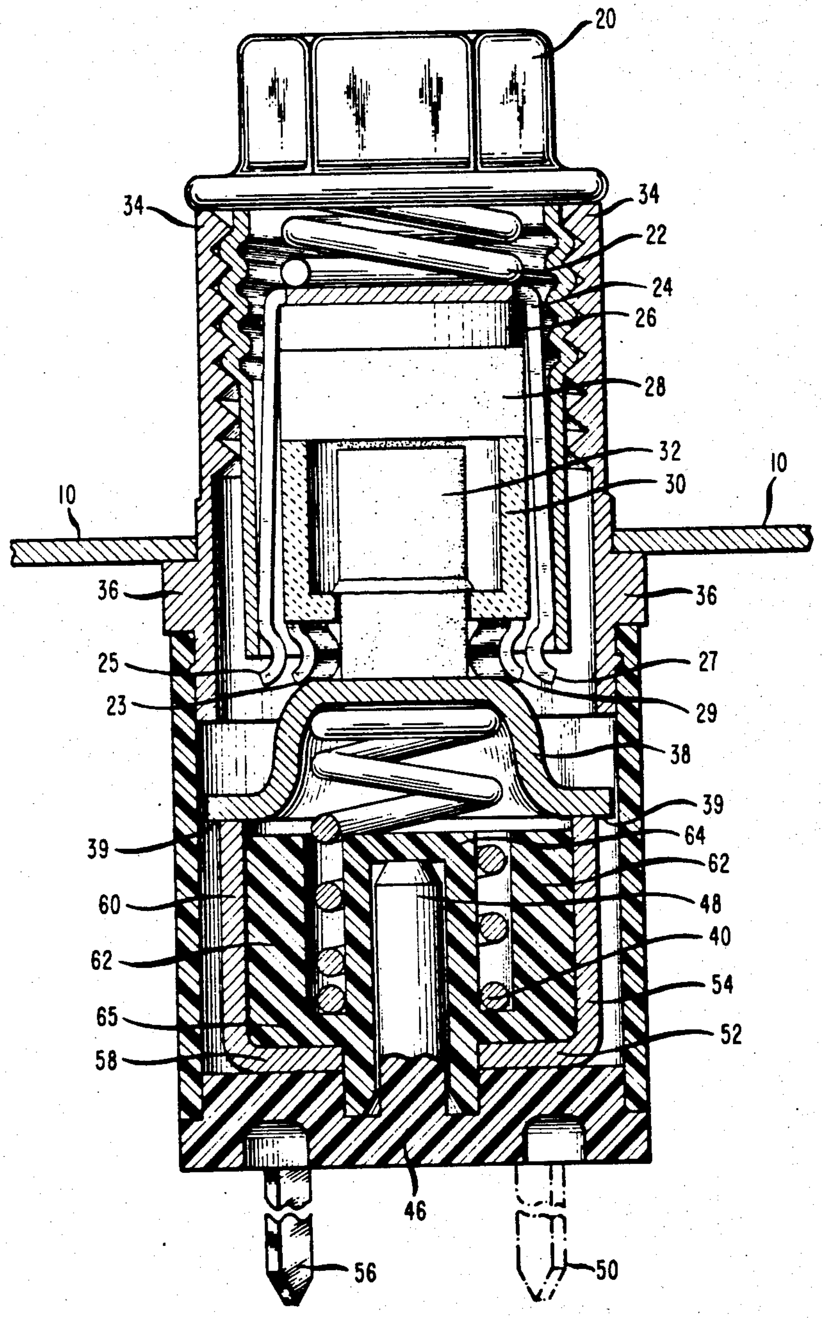

When spurious high voltages and high currents are introduced into the circuit the protector unit operates in substantially the same manner as described hereinabove. FIGS. 8 and 9 correspond to FIGS. 4 and 5, respectively.

Figure 10:
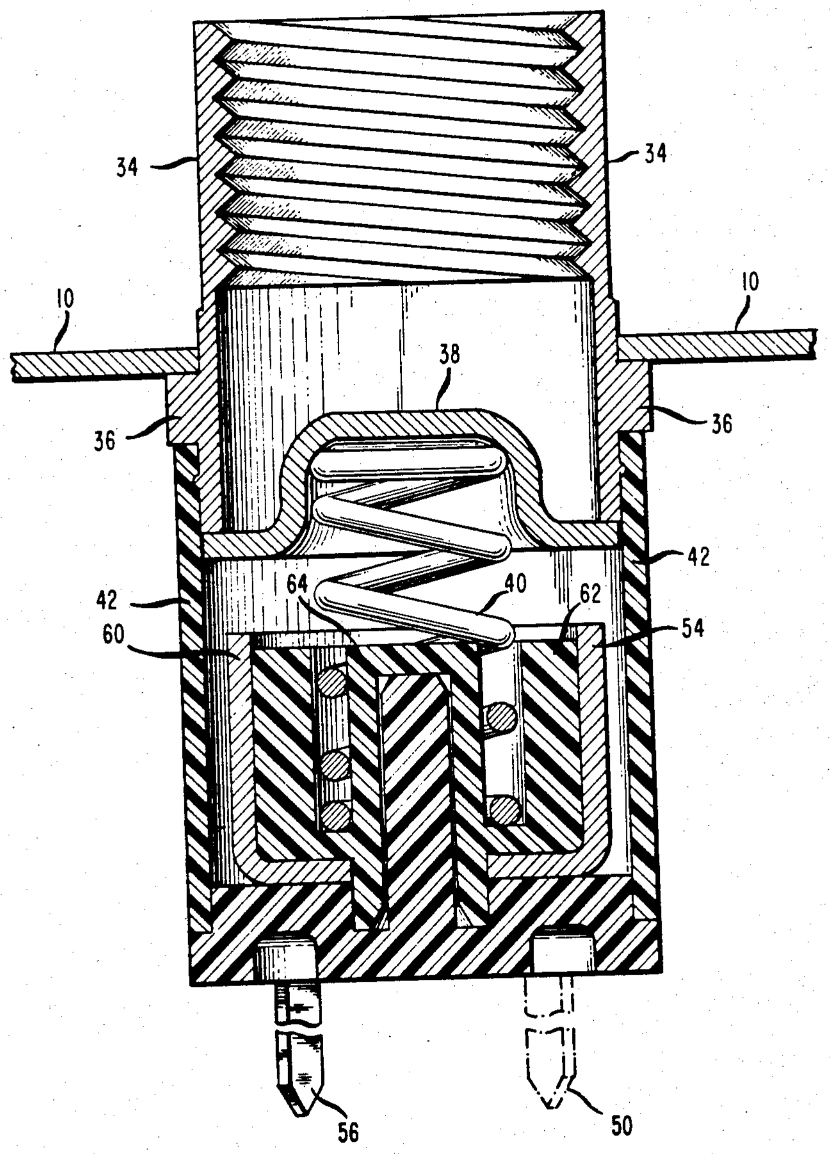

Referring to FIG. 10, there is shown the operation of insulator 62 when the protector unit is removed for replacement. The path of the signal will flow from either terminal 50 or 56 through arms 54 or 60, respectively, but not further because bridge disk 38 is removed therefrom by spring 40. Because of insulator 62, however, spring 40 will not make contact with either terminal 50 or 56. In this case the circuit is in an open condition because there exists a break in the continuity between a customer's equipment and the central office.

Figure 11:
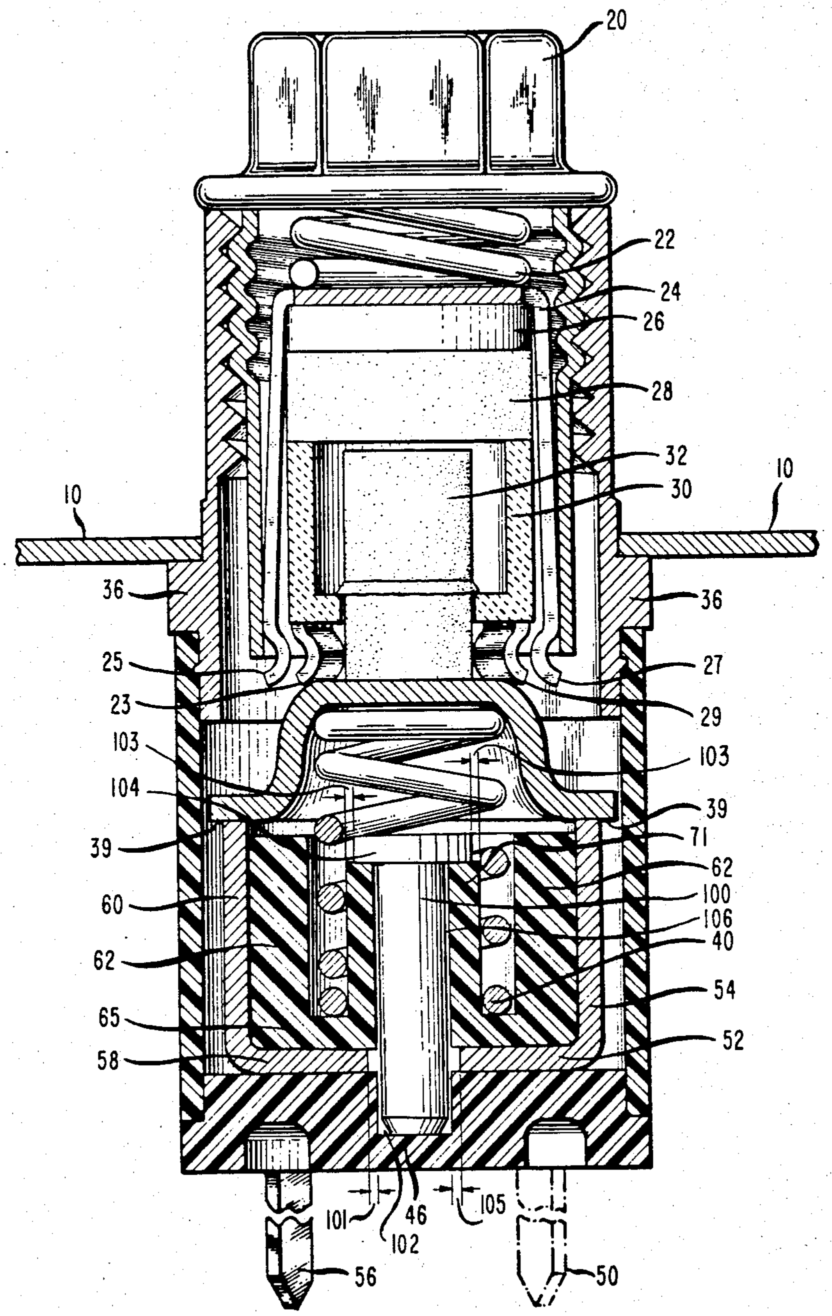
FIGS. 11 and 12 show yet another embodiment of the present invention for protecting the line in the open condition.
Figure 12:
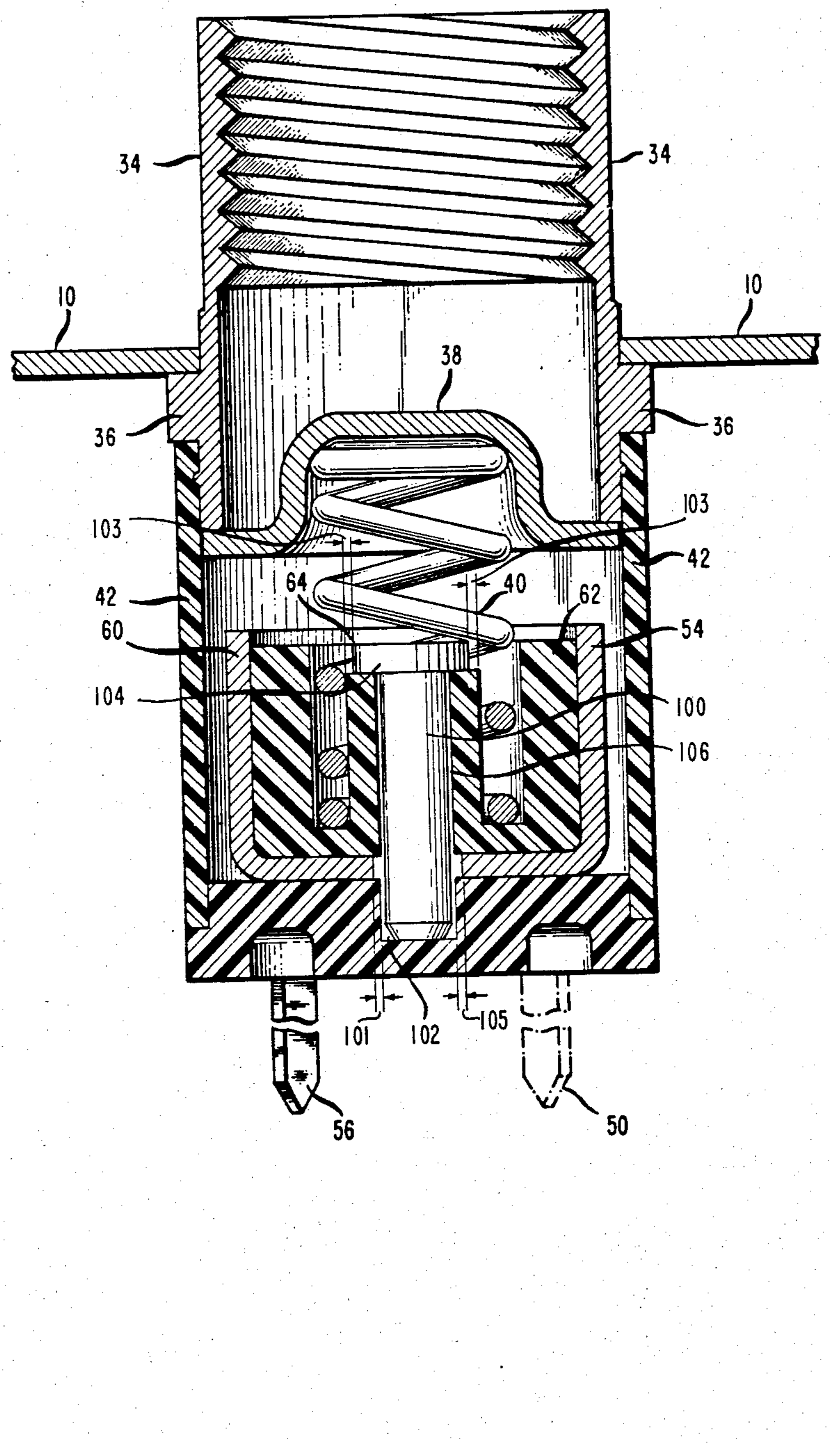

Referrig to FIGS. 11 and 12, there is shown another embodiment of the protector device for a line which is exposed to unusually high voltages when in the open condition. FIG. 11 shows a protector in place and FIG. 12 shows the protector removed when the line is in the open condition. This embodiment operates in a similar manner to the previous embodiment of FIGS. 7 through 10. Base 46 of FIG. 1 and FIGS. 7 through 10 has been modified. Central post 48 has been removed and a cylindrical, hollow cavity 102 is centrally located.

Furthermore, top 64 of central cylinder 71 of spacer 62 has been removed and a hole 106 is drilled centrally in cylinder 71 to be concentric with the outer surface thereof. When spacer 62 is assembled, the inner surfaces of hole 106 and cavity 102 are aligned. A metallic post 100 is dropped into the aforesaid aligned hole 106 and cavity 102 so that top 104 of post 100 rests upon the top of inner cylinder 71 of insulator 62, in such a way as to be locked in place. Locking post 100 in place prevents it from moving away from terminals 50 and 56. The means for locking can be accomplished in any one of many known ways, and being trivial, is not disclosed herein. One such means comprises threads on post 100 and cavity 102 (not shown).

The spacings 101 and 105, respectively, between the shaft of post 100 and surface 58 of terminal 56 and between surface 52 of terminal 50 and shaft of post 100 determine the voltage amplitude which may arc over therebetween. The uniform spacing 103 between head 104 of central post 100 and spring 40 control the voltage which may arc over therebetween to ground when protection is not present.

When the protector unit has been removed, cup 39 is urged upwards by spring 40, opening the line. Should an unusually high voltage develop in the line, in this open condition, the voltage would arc over from either terminal 56 or 50 to central post 100, to spring 40, to cup 39, to grounding barrel 36, to ground plate 10 and then to ground.

What is claimed is:

1. A protector module which protects telecommunications equipment from damage caused by spurious voltages or currents said module comprising an electrically conductive grounding barrel capable of being housed within one of a plurality of receptacles of a grounding chassis, said grounding barrel having a first internally threaded end and a second smooth surfaced end, a protector unit having a threaded outer surface mating with said first end of said grounding barrel, and means for grounding a conductor of a circuit when said protector unit is removed from said grounding barrel, said grounding means mating with said second smooth surfaced end of siad grounding barrel, one end of said circuit being connected to said telecommunications equipment and the other end of said circuit being connected to a telephone central office.

2. The protector module of claim 1 wherein said means for grounding a conductor comprises first electrically conductive terminal, a second electrically conductive terminal, means for securely holding said first and second conductive terminals in a substantially vertical position, a cylinder receiving and fastening said holding means, an electrically conductive bridging plate, and an electrically conductive resilient means for separating said first and second terminals from said bridging plate.

3. The grounding means of claim 2 wherein said first and second terminals comprises respectively, first and second semicircular annular plates and first and second arms.

4. The grounding means of claim 3 wherein said bridging plate comprises a flat annular surface for making electrical contact with said first and second arms, said annular surface adapted to make electrical contact with said grounding barrel under force from said resilient means when said protector unit removed from said module, and a concave shaped disc for making electrical contact with said resilient means, the outer surface of said disc making electrical contact with said protector unit.

5. The grounding means of claim 4 wherein said securely holding means comprises a base having a circular flat surface which has first and second recesses therethrough for receiving said first and second terminals an upwardly pointing post located centrally on said flat surface for receiving said resilient means, and a hollow cylindrical spacer which rests on said flat surface, said cylindrical spacer having first and second recesses on opposite sides thereof for receiving and holding said first and second arms.

6. The protector unit of claim 5 comprising a hollow, electrically conductive, metallic cylindrical housing having one of its ends closed and receiving an electrically conductive spring and an electrically conductive cage comprising one or more downwardly pointing resilient fingers said cage receiving a solder pellet, a first carbon block and a hollow, ceramic cylinder comprising a second carbon block there existing a predetermined air gap between said first and second carbon blocks, said second carbon block making electrical contact with the outer top surface of said concave shaped disc under pressure from said spring.

7. A protector module for protecting telecommunications equipment form damage caused by spurious voltages or currents said module comprising an electrically conductive grounding barrel capable of being housed within one of a plurality of receptacles of a grounding chassis, said grounding barrel having a first internally threaded end and a second smooth surfaced end, a protector unit having a threaded outer surfaces mating with said first end of said grounding barrel, and means for opening the electrical path of a conductor in a circuit when said protector unit is removed from said grounding barrel, one end of said circuit being connected to a telephone central office, the other end being connected to a telecommunications equipment located remotely from said central office.

8. The protector module of claim 7 wherein said means for opening the electrical path comprises a first electrically conductive terminal connected to said conductor which terminates at said central office, a second electrically conductive terminal connected to said conductor which terminates at said telecommunications equipment, means for securely holding said first and second terminals in a substantially vertical position, a cylinder receiveing and fastening said securely holding means, an electrical conductive bridging plate, and an electrically conductive resilient means for separating said bridging plate from said securely holding means.

9. The protector module of claim 8 wherein said first and second terminals comprises, respectively, first and second semicircular annular plates and first and second arms.

10. The protector module of claim 9 wherein said bridging plate comprises the lower surface of a flat annular plate for making electrical contact with said first and second arms under normal operating conditions, the upper surface of said annular plate making electrical contact with said grounding barrel under pressure from said resilient means and simultaneously therewith disconnecting the electrical path between said first and second arms when said protector unit is removed from said protector module, thereby establishing an open circuit between said central office and said telecommunications equipment, and a concave shaped disc for making electrical contact with said resilient means the outer surface of said disc making electrical contact with said protector unit when a spurious current appears on said conductor.

11. The protector module of claim 10 wherein said securely holding means comprises a base having a circular flat surface which has first and second recesses therethrough for receiving said first and second terminals and an upwardly pointing post located centrally on said flat surface, and an electrically nonconducting spacer comprising a first hollow cylinder located concentrically within a second hollow cylinder one end of said first cylinder being closed at the top the other end of said first cylinder being attached to one end of said second cylinder so as to form an annular space therebetween for receiving said resilient means, and said first cylinder mating with said post of said base.

12. protector module of claim 11 wherein said protector unit comprises a hollow electrically conductive metallic cylindrical housing having one of its ends closed and an electrically conductive spring and an electrically conductive cage comprising one or more downwardly pointing resilient fingers said cage receiving a solder pellet a first carbon block and a ceramic cylinder comprising a second carbon block there existing a predetermined air gap between said first and second carbon blocks said second carbon block making electrical contact with the outer top surface of said concave shaped disc, under pressure from said spring.

13. The protector module of claim 7 wherein said means for opening the electrical path comprises a first electrically conductive terminal connectable to said conductor which terminates at said central office, a second electrically conductive terminal connectable to said conductor which terminates at said communications equipment, means for securely holding said first and second terminals in a substantially vertical position and having a centrally located cylindrical cavity, a cylindrical spacer having a central post and an annular space surrounding said central post, said central post having a centrally located, cylindrical hole extending therethrough and which is aligned with said cylindrical cavity, a cylindrical post housed within said cylindrical hole and said cylindrical cavity, an electrically conductive bridging plate, and an electrically conductive resilient means housed within said annular space and retained therewithin by said bridging plate.

14. The protector module of claim 13 wherein said first and second terminals comprise, respectively, first and second semicircular annular plates and first and second arms, said cylindrical spacer located between said first and second arms.

15. The protector of claim 14 wherein said bridging plate comprises a flat annular plate on the lower surface of said plate for making electrical contact with said first and second arms under normal operating conditions, the upper surface of said surface of said annular plate making electrical contact with said grounding barrel when urged upwards by said resilient means and simultaneously therewith disconnecting the electrical path between said first and second arms when said protector unit is removed from said protector module, thereby establishing an open circuit between said central office and said telecommunications equipment, spurious voltages being conducted during said open condition from said first and second terminals to said cylindrical post to said resilient means to said bridging plate to said grounding barrel to said grounding plate, and a concave shaped disc, the lower surface of said disc making electrical contact with said resilient means, the upper surface of said disc making electrical contact with said protector unit under normal operating conditions.

16. The protector module of claim 15 wherein the space between said first and second annular plates of said first and second terminals controls the voltage which may arc over from said first and second terminal to said cylindrical post.

* * * * *